United States Patent [19]
Cotter et al.

[11] 3,876,395
[45] Apr. 8, 1975

[54] METHOD FOR THE ADSORPTION OF SULFUR DIOXIDE

[75] Inventors: Robert J. Cotter, Bernardsville; Michael J. Keogh, Somerville; William D. Heitz, Flagtown, all of N.J.

[73] Assignee: Union Carbide Corporation, New York, N.Y.

[22] Filed: July 17, 1974

[21] Appl. No.: 489,126

Related U.S. Application Data

[63] Continuation-in-part of Ser. No. 448,999, March 7, 1974, abandoned.

[52] U.S. Cl..................... 55/73; 55/74; 260/268 PL
[51] Int. Cl...................... B01d 53/00; B01d 53/04
[58] Field of Search .................. 55/73, 74; 423/243; 260/2 EP, 268 PL

[56] References Cited
UNITED STATES PATENTS

| | | | |
|---|---|---|---|
| 2,963,483 | 12/1960 | Heywood | 210/54 X |
| 3,498,026 | 3/1970 | Messinger et al. | 55/73 |
| 3,646,594 | 2/1972 | Lasky et al. | 55/74 X |
| 3,780,500 | 12/1973 | Clemens et al. | 55/73 |
| 3,793,434 | 2/1974 | Leder | 423/243 X |

*Primary Examiner*—Charles N. Hart
*Assistant Examiner*—Ethel R. Cross
*Attorney, Agent, or Firm*—Bernard Francis Crowe

[57] ABSTRACT

Sulfur dioxide can be adsorbed from gas mixtures using cross-linked, water-insoluble polymers of N-glycidylpiperazine or N-glycidyl polyalkylpiperazines as the adsorbents.

11 Claims, No Drawings

METHOD FOR THE ADSORPTION OF SULFUR DIOXIDE

This is a continuation-in-part of Ser. No. 448,999 filed Mar. 7, 1974, now abandoned.

BACKGROUND OF THE INVENTION

This invention pertains to the adsorption of $SO_2$ from gas mixtures and in particular to the use of cross-linked polymers of N-glycidylpiperazine or N-glycidyl polyalkylpiperazines as the adsorbents.

Power plant gas effluents as well as other industrial waste gases contribute to the general environmental air pollution problems extant. One of the six chief air pollutants, $SO_2$, is a common component of these waste gases. In the past many methods have been used in attempts to reduce $SO_2$ air pollution by control at its source, but none are being practiced widely in attempts to consistently meet the National Air Quality Standards which call for a maximum of 0.14 parts per million (ppm) of $SO_2$ for a 24 hour period. Alkaline water scrubbing, ammonia scrubbing, and limestone scrubbing are examples of limited solutions to this problem. Similarly, effective means for removing $SO_2$ from ambient air, especially within buildings and homes, are not available. Since people spend about 80% of their lives indoors, control of pollutant concentrations that they actually come into contact with represents another approach to solving air pollution problems.

It is an object of this invention to provide a method of $SO_2$ adsorption from gas mixtures, including ambient indoor and outdoor air, which is selective for $SO_2$. For example, $CO_2$ is present in stack gases in much larger quantities than $SO_2$ and its adsorption is undesirable.

Another object of this invention is to provide an adsorbent with a high capacity for $SO_2$ adsorption which is chemically stable, water-insoluble and which is readily regenerated.

SUMMARY OF THE INVENTION

The above objects have been satisfied by a method which comprises contacting gas mixtures containing sulfur dioxide and moisture with a crosslinked, water-insoluble polymer of N-glycidylpiperazine or N-glycidyl polyalkylpiperazines at a temperature of about $-10°$ to about 100°C. Although about 5% by weight of $SO_2$ will be removed from dry gas mixtures, it is preferred for efficient $SO_2$ removal that the gas mixtures contain at least 0.1% by weight of water vapor. For optimum $SO_2$ removal efficiency it is preferred that the gas mixture contain from about 0.7 to about 1.5% by weight of water vapor.

The adsorbent may be used in the form of porous particles of the N-glycidylpiperazine polymer or the N-glycidylpiperazine polymer may be deposited on a support, preferably one having a high surface area. This may be readily accomplished by taking an aqueous solution of N-glycidylpiperazine oligomer, immersing a support as for example, porous polyurethane open cell foam, in the aqueous oligomer solution, removing the excess solution from the pores of the foam, and thermally curing the coatings to a water-insoluble, cross-linked polymer on the surface of the foam. The nature of the support is not critical and so myriad materials may be used, as for example, industrial filter paper, glass fiber matting, plastic mesh screens, composites of wood-flour/poly(ethylene oxide) (e.g., 50:50 by wt.), porous siliceous materials such as clay, macroreticular polystyrene beads, and the like.

A method of making N-glycidylpiperazine has been described in U.S. Pat. No. 2,963,483 by D. L. Heywood. Homologs are obtained, when, e.g., 2,5-dimethylpiperazine or 2,6-dimethylpiperazine are substituted for piperazine itself.

The oligomer of these N-glycidylpiperazine compounds having the structure:

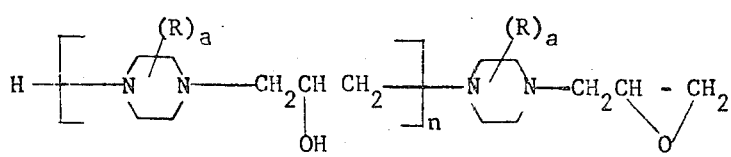

wherein each R is a lower alkyl group having up to about 8 carbon atoms, $a$ is an integer having values of 0 to 4, and $n$ is an integer having values of about 2 to about 20, can be prepared by interpolymerizing piperazine or a polyalkylpiperazine with epichlorohydrin under controlled conditions.

As an extension of this work the diglycidyl ether of Bisphenol A (2,2-bis(p-hydroxyphenyl)propane) was interpolymerized with piperazine to afford a polymer having the repeating unit shown below.

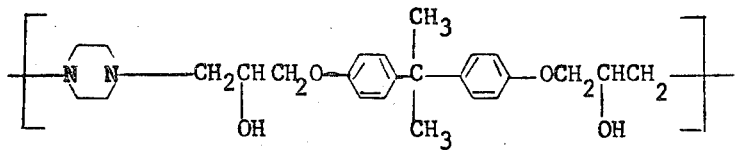

The adsorbents of this invention possess the added benefit of adsorbing $SO_2$ preferentially over $CO_2$. This selectivity is achieved in conjunction with a high capacity for the adsorption of $SO_2$. The adsorbents of this invention are also chemically stable and easily regenerated by raising the temperature of its surroundings to a temperature of about 60° to about 160°C.

The paradoxical overlap of adsorption and desorption temperatures is reconcilable by virtue of the fact that the adsorptive capacity of these polymers decreases with increase of temperature. Thus, if the $SO_2$ adsorption process is carried out at a low temperature, as for example, 20°C. until the adsorbent is saturated and the temperature is then raised to say 60°C. some of the $SO_2$ adsorbed will be desorbed until the saturation level of the adsorbent at that temperature is reached. If the temperature is further raised to above about 110°C., essentially all of the adsorbed $SO_2$ will be desorbed.

The desorbed $SO_2$ may be converted to liquid $SO_2$, sulfur or other useful by-products. Regeneration may also be effected by contacting the adsorbent with a base such as an alkali metal hydroxide, alkaline earth hydroxide, or an alkali metal alkoxide having 1 to about 4 carbon atoms and the like.

The N-glycidylpiperazine polymers used as adsorbents in this invention are mechanically stable as are the articles fabricated by depositing the adsorbents on suitable substrates.

The mechanism of adsorption of $SO_2$ by the N-glycidylpiperazine polymers of this invention may take place either by charge transfer or by ionic complexation. In the former case, anhydrous $SO_2$ and the tertiary amine moiety of the polymer form a Lewis type acid-base complex as shown below:

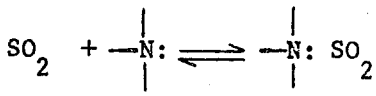

Unlike the charge transfer mechanism, $SO_2$ adsorption by ionic complexation will occur best when the gas contains some moisture. This mechanism involves formation of sulfite or bisulfite ions that complex with the amine as shown below:

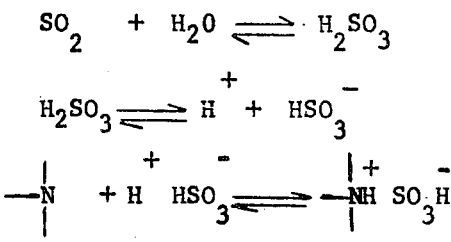

The evaluation of various $SO_2$ adsorbent systems was conducted with apparatus constructed specifically for that purpose. The system was composed of a gas metering device and an $SO_2$ monitor. In operation, the monitor was first calibrated with a gas containing a standarized concentration of $SO_2$. Once this calibration had been completed, the adsorbents were tested by inserting a test specimen in the gas line before the monitor and observing the registered change in the $SO_2$ concentration of the effluent gas stream.

The calibration gases were either drawn from a cylinder or generated by $SO_2$ permeation tubes prepared by the National Bureau of Standards to emit a constant weight of $SO_2$ at a specified temperature. The cylinders of gas were used when high $SO_2$ concentrations were required whereas permeation tubes were used for low $SO_2$ concentrations i.e., in the range of 0.5 to 5.0 ppm (parts per million). Authentic, ambient air was used to evaluate these adsorbents for their effectiveness in removing the $SO_2$ therein, i.e., in the range of 0.01–0.2 ppm. $SO_2$ concentrations were measured with a Dynasciences monitor and a continuous, colorimetric method based on the West-Gaeke method for $SO_2$ analysis.

The preparation of crosslinked, poly(N-glycidylpiperazine) can be effected by carrying out the polymerization of N-glycidylpiperazine oligomer followed by a crosslinking operation at a temperature of about 80° to 180°C. in situ. Thus, for example, a suspension of 5 weight percent N-glycidylpiperazine oligomer in n-heptane can be heated at reflux, i.e., 98.4°C. to effect polymerization, followed by crosslinking. The initially insoluble oligomer is directly converted to particulate polymer without any evidence of dissolution and reprecipitation. After a reflux time in n-heptane as short as 4 hours, the polymer obtained is swollen by but is insoluble in water. Longer reaction times result in increasing the degree of crosslinking as evidenced by a lower degree of swelling in water. The organic liquid used for the polymerization is not critical and thus an aromatic liquid, such as xylene, which boils at 140°C. also serves for the polymerization and subsequent crosslinking of N-glycidylpiperazine oligomer. Yields of crosslinked poly(N-glycidylpiperazine) are essentially quantitative.

The particle size of the crosslinked poly(N-glycidylpiperazine) can be controlled by regulating the degree of stirring. This, for example, rapid stirring during the polymerization affords polymer particles which pass through a 50 mesh screen. Under less vigorous stirring conditions, polymer particles averaging one-eighth of an inch in diameter were obtained. With moderate stirring a mixture of fine and coarse particles can be produced. Crosslinked poly(N-glycidylpiperazine) prepared in both n-heptane and xylene was examined under a scanning electron miscroscope. The porous nature of the polymer particles obtained was readily apparent as well as the similarity of the two polymers produced in the two solvents. The miscroscopic morphology of these polymers was that of plate-like crystals. In preparing polymer adsorbents of this invention on supports, it is convenient to apply the polymer as an aqueous solution and heat to a temperature of about 100° to 180°C.

For commercial scale $SO_2$ removal operations, a variety of fabricated filter elements, such as honeycombs, corrugations, cylinders, meshes, fibrous panels, etc. can be employed. These can be tailor-made to be fitted in pipes, conduits, chimney-stacks and the like. They can be designed for use in a static, or fixed mode, or in a dyanamic, moving bed mode of operation.

The invention is further described in the examples which follow.

All parts and percentages are by weight unless otherwise specified.

EXAMPLE 1

Preparation of N-glycidylpiperazine Oligomer

Piperazine (86.15 g., 1 mole) and ethanol (150 g. plus 1.5 g. water) were placed in a 1 liter 3-neck flask equipped with a stirrer, thermometer, dropping funnel and condenser. The mixture was stirred until a complete solution was obtained and then epichlorohydrin (92.53 g., 1 mole) was added dropwise while maintaining the temperature below 25°C., by means of an ice bath. After addition of the epichlorohydrin was complete, the temperature was maintained below 25°C. for an additional 30 minutes. Then a solution of 56.11 g. (1 mole) of potassium hydroxide in 225 g. of ethanol was added over a period of 30 minutes while maintaining the temperature below 25°C. After cooling to 15°C. the potassium chloride which had formed during the reaction was filtered from the mixture and the filtrate concentrated to one-half its volume by stripping under vacuum. One liter of ethyl acetate was then added to the residual filtrate. The N-glycidylpiperazine oligomer precipitated as a white solid. The resultant slurry was filtered after standing several hours. The N-glycidylpiperazine oligomer collected on the filter after drying in vacuo at room temperature amounted to 119 grams, 83.8% of the theoretical yield. Elemental analysis indicated: %C., 56.09; %H, 9.55; %N, 18.55; %O 15.77. The number average molecular weight as determined by vapor pressure osmometry was 705. This data corresponds to the formula:

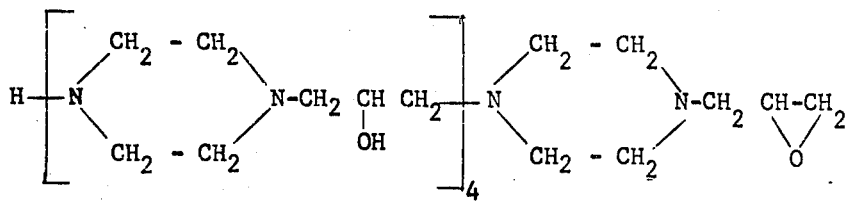

EXAMPLE 2

Polymerization and Crosslinking of N-glycidylpiperazine Oligomer

Fifty grams of N-glycidylpiperazine oligomer prepared as in Example 1 was charged to a resin kettle equipped with stirrer, reflux condenser, thermometer and heater together with 950 g. of n-heptane. The mixture was heated with stirring for 7 hours at a reflux temperature of about 98°C. Filtration of the reaction mixture afforded 49.05 g. of particulate, porous, cross-linked, water insoluble, poly(N-glycidylpiperazine). This polymer was found to have a surface area of 7.0 square meters per gram when measured in accordance with the standard BET nitrogen absorption test which is described in "Surface and Colloid Science" Vol. 2 pg. 85–89 Wiley-Interscience, NYC 1969. This material having an average particle size of less than 50 mesh was particularly useful in preparing articles for adsorption of $SO_2$ from moist gas streams containing $SO_2$. These articles were fabricated by first immersing fluted Whatman filter paper in a 20% aqueous solution of N-glycidylpiperazine oligomer and then powder coating the paper with the porous, particulate, water insoluble poly(N-glycidylpiperazine) obtained above. This was then heated to 130°C. for about 2 hours which caused the oligomer to polymerize, cross-link and bond to the particulate poly(N-glycidylpiperazine). The resultant articles when exposed to a gas stream containing 3000 ppm or 0.3% of $SO_2$ and 1.2% $H_2O$ adsorbed 45% of the polymer weight of $SO_2$ and reduced the $SO_2$ content of the gas stream to about 30 ppm.

EXAMPLE 3

Preparation of Polyurethane Foam Coated with Crosslinked poly(N-glycidylpiperazine)

Six specimens measuring one inch thick by 3 by 4 inches were cut from open-cell polyurethane foam supplied by Paramount Industries, having a porosity of 45 pores per linear inch and a bulk density of about 2 pounds per cubic foot. The specimens were immersed in a bath of 20 weight percent aqueous solution of N-glycidylpiperazine oligomer for 10 minutes. The specimens were then taken out of the bath and the excess solution removed from the foam pores by placing the specimens on a Buchner funnel under vacuum, covered with a rubber dam at a pressure of 15 inches of mercury. The specimens were then placed in an oven at 100°C. for 16 hours. This effected the curing or polymerization of the N-glycidylpiperazine oligomer to a crosslinked, insoluble polymer on the surface of the polyurethane foam. The polymeric coatings comprised 19 weight percent of each specimen. For evaluating the efficacy of the coated polyurethane foams as to adsorption, smaller specimens 1 inch long were cut from the 6 specimens described above with a ¼ inch cork borer and then mounted in ¼ inch I.D. Teflon columns. These columns were placed in the $SO_2$ adsorption apparatus described earlier and a test mixture of nitrogen containing 1.2 ppm of $SO_2$ was passed through the apparatus at a space velocity of 3,400 $hr^{-1}$. The gas stream was humidified to contain 1.2 percent water and the temperature of the test chamber being 30°C. The effluent gas analyzed with the $SO_2$ Dynasciences analyzer was found to contain less than 0.05 ppm of $SO_2$.

This experiment was repeated at a space velocity of 12,400 $hr.^{-1}$ and the effluent gas was shown to contain 0.09 ppm. of $SO_2$.

This experiment was repeated again at a space velocity of 20,000 $hr.^{-1}$. The effluent gas contained 0.21 ppm of $SO_2$.

Space velocity as used in this invention is defined as:

$$\text{Space velocity} = \frac{\text{flow rate of gas (ml./min)} \times 60}{\left(\begin{array}{c}\text{total volume of}\\ \text{adsorbent sample}\\ \text{in adsorption tube}\\ \text{(ml.)}\end{array}\right) = \left(\begin{array}{c}\text{weight of adsorbent in grams}\\ \text{assuming a density of 1}\end{array}\right)}$$

EXAMPLE 3A

Adsorption of $SO_2$ from Ambient Air by Polyurethane Foam Coated with Crosslinked poly(N-glycidylpiperazine)

A foam filter was prepared by placing poly(n-glycidylpiperazine)-coated, open cell, polyurethane foam (45 pores per inch, as prepared and described in Example 3) in a tube of shrinkable Teflon tubing that was fitted with end connectors of glass tubing. The foam plug containing 20.3% (by weight) of poly(N-glycidylpiperazine) and measuring 2 inches long × ¼ inch in diameter weighed 0.0834 grams. Ambient air (moisturized to 80–95% relative humidity) was passed through this foam filter at a rate of 600 cc/min. and the effluent monitored for $SO_2$ by means of a West-Gaeke continuous colorimetric method. Throughout this Example which was terminated voluntarily after 4 days (96 hours), the concentration of $SO_2$ in the effluent air from the filter was less than 0.002 ppm or 2 ppb (parts per billion. Simultaneous analysis of an unfiltered, ambient air stream as a Control showed that its $SO_2$ concentration varied over the range of 0.012–0.200 ppm. Another Control employing a filter made from an uncoated plug of polyurethane foam (2 × ¼ inches) showed that no $SO_2$ was removed from the moisturized ambient air stream at a flow rate of 600 cc/min. These results clearly demonstrate the high efficiency of the poly-(N-glycidylpiperazine) adsorbents at extremely low $SO_2$ concentrations.

EXAMPLE 4

Adsorption of $SO_2$ by a Wood Flour Composite Coated with Crosslinked Poly(N-glycidylpiperazine)

A particulate composite of 50 weight percent Douglas fir wood flour having a particle size of less than 20 microns and 50 weight percent of crosslinked poly(ethylene oxide) having a molecular weight of about 600,000 was immersed in a 5 percent aqueous solution of N-glycidylpiperazine oligomer and then spread in a thin layer over the bottom of a tray which was then exposed to a temperature of 60°C. for 16 hours. This resulted in forming a crosslinked poly(N-glycidylpiperazine) composite within the wood flour-poly(ethylene oxide) mixture. After removing water and drying the resultant composite, the particles were ground to the desired particle size and placed in 1 inch columns of ¼ inch i.d. Teflon tubing. These tubes were then placed in the $SO_2$ adsorption apparatus described above and used in Example 1. Nitrogen gas containing 1.2 ppm of sulphur dioxide was passed through the apparatus at a space velocity of 3,400 hr.$^{-1}$. The effluent gas contained less than 0.05 ppm of $SO_2$. In a second experiment the space velocity of the $SO_2/N_2$ gas mixture was 12,400 hr.$^{-1}$. The effluent gas contained 0.08 ppm of $SO_2$. In the third experiment the space velocity of the $SO_2$ containing nitrogen gas was 20,000 hr.$^{-1}$. The effluent gas contained 0.13 ppm of $SO_2$. The amount of polymeric, crosslinked N-glycidylpiperazine in the composite was 20 weight percent. As in Example 3 the gas stream was humidified with 1.2 percent water and the test temperature was 30°C.

EXAMPLE 5

Adsorption of $SO_2$ by Paper Coated with Crosslinked poly-(N-glycidylpiperazine)

Example 3 was repeated using Whatman filter paper coated with polymerized, crosslinked poly-(N-glycidylpiperazine). The polymer was coated on to the filter paper under the same conditions as described in Example 3. The effluent gas contained less than 0.05 ppm of sulphur dioxide when the space velocity was 3,400 hr.$^{-1}$, and 0.16 ppm of $SO_2$ when the space velocity was 20,000 hr.$^{-1}$. The filter paper contained a coating of 42 percent polymer.

EXAMPLE 6

Adsorption of $SO_2$ by Glass Fiber Coated with Crosslinked Poly(N-glycidylpiperazine)

Example 4 was repeated with the exception that the N-glycidylpiperazine oligomer was coated, polymerized and crosslinked onto glass fiber instead of polyurethane foam to give a coating of 14 percent polymer. At a space velocity of 3,400 hr.$^{-1}$, the effluent gas contained 0.34 ppm of $SO_2$.

EXAMPLE 7

Adsorption of $SO_2$ on Polyproplene Coated with Crosslinked Poly(N-glycidylpiperazine)

Example 4 was repeated with the exception that the N-glycidylpiperazine oligomer was coated, polymerized and crosslinked on to polypropylene fiber to give a coating of 10 percent polymer. At a space velocity of 3400 hr.$^{-1}$, the effluent gas contained 0.33 ppm of $SO_2$.

EXAMPLE 8

Adsorption of $SO_2$ on Charcoal Coated with Crosslinked Poly(N-glycidylpiperazine)

Example 4 was repeated with the exception that charcoal was treated with N-glycidylpiperazine oligomer and heated as in Example 4 to give a deposit of crosslinked poly(N-glycidylpiperazine). At a space velocity of 3400 hr.$^{-1}$, the effluent $SO_2$ in the effluent gas stream was found to be 0.18 ppm.

EXAMPLE 9

Preparation of Water-insoluble, Crosslinked Particulate Resin from N-glycidylpiperazine Oligomer A 1-liter resin kettle equipped with a condenser, Dean-Stark moisture trap, thermometer and stirrer was charged with 500 ml of toluene, 0.4 g. of Parlon S-125 (a chlorinated polybutadiene resin commercially available as a surfactant from Hercules Powder Company, Wilmington, Del.) and 100 ml. of a 20 weight percent solution of N-glycidylpiperazine oligomer (prepared as in Example 1). The charge was heated to reflux with vigorous stirring and maintained at the reflux temperature for 3 hours. Water was removed in the Dean-Stark moisture trap during this period. The kettle was cooled and water-insoluble, crosslinked beads of N-glycidylpiperazine resin were recovered by filtration. After drying in vacuo the yield was found to be 20.9 g. The beads were observed to have an average diameter of about 1.0 mm. and were insoluble but swelled in water.

EXAMPLE 10

Adsorption of $SO_2$ by N-glycidylpiperazine Particulate Resin

Five grams of the particulate resin prepared in Example 9 from N-glycidylpiperazine oligomer was hydrated with 10% by weight of water. Teflon tubes, 9 inches long having an I.D. of three-sixteenths inch were filled with 2.469 g. of hydrated resin. The efficacy of this resin was evaluated by mounting the filled Teflon tubes in an oven maintained at 40°C. A standard gas mixture containing 14.3% $CO_2$, 0.3% $SO_2$ (3,000 ppm of the total gas mixture) and the remainder nitrogen was first bubbled through water that had first been saturated with a 3,000 ppm of $SO_2$ gas stream, then to the Teflon tube filled with resin and the effluent gas from the Teflon tube was tested with a Draeger tube or a Kitigawa tube which measured the $SO_2$ content of the effluent gas stream. The effluent gas passed through at a rate of 87.5 cc./min. or 0.0455 g.$SO_2$/ hour. After 20 minutes the $SO_2$ content of the gas stream dropped in the effluent from 3,000 ppm to less than 10 ppm. After 2 hours this figure was 25 ppm and after 2.5 hours it was 50 ppm. The test was stopped after 2 hours and 40 minutes when the effluent was found to contain about 2400 ppm. All prior measurements were made with a Draeger tube and the last with a Kitigawa tube. The resin was removed from the Teflon tube and weighed. It was found that this resin had adsorbed 5.1% by weight of $SO_2$.

EXAMPLE 11

Preparation of Particulate Resin from Piperazine and Epichlorohydrin in Water

A 1-liter resin kettle equipped with a Dean-Stark water trap, a condenser, thermometer and mechanical paddle stirrer was charged with 86.14 g. (1 mole) of piperazine and 300 g. of water. The mixture was stirred at 40°C. until a homogeneous solution was obtained. The resultant solution was cooled to 25°C. and 92.53 g. (1 mole) of epichlorohydrin was added dropwise over a period of 45 minutes while maintaining the temperature of the mixture at 25°C. The contents of the flask were held at 25°C. for an additional 30 minute period, and then 56.11 g. (1.0 moles) of KOH in 224 g. of water was added dropwise over a period of 30 minutes, holding the temperature at 25°C. Water was then removed under vacuum. A portion, 58 ml., of the residue left in the flask was charged to a 1-liter resin kettle equipped as above together with 500 ml. of toluene and 0.4 g. of Parlon S-125. The mixture was heated to reflux and about 35 ml. of water removed through the Dean-Stark moisture trap. Refluxing was continued for 3 hours. The flask was cooled, the contents filtered and the beads of poly(N-glycidylpiperazine) collected on the filter were then dried in vacuo at 40°C. overnight. A yield of 27.4 g. of water-insoluble beads containing KCl was obtained.

Five grams of the beads so-obtained were hydrated in a water vapor chamber to 10% by weight. These were used to pack Teflon tubes 9 inches long having an I.D. of three-sixteenths inch with 2.1886 g. of beads. The procedure described in Example 10 was used to evaluate the efficacy of the beads as $SO_2$ adsorbents. The same standard gas mixture at an oven temperature of 40°C. was passed through the tube for 3 hours at which time the Dynasciences Monitor indicated 12 ppm of $SO_2$ were passing through unadsorbed. The same flow conditions as Example 10, were used viz., 87.5 cc./min of standard gas mixture containing 3000 ppm of $SO_2$ and about 1.0% of water. This corresponds to a flow of 0.0455 g. of $SO_2$/hour in the influent stream. The tube was dried and weighed. It was found that the beads had adsorbed 6.9% of their own weight of $SO_2$.

The efficiency of $SO_2$ adsorption by N-glycidylpiperazine particulate resin can be increased by increasing the porosity of the resin particles. This can be accomplished by carrying out the preparation of N-glycidylpiperazine oligomer in water as a solvent. The water is then removed by azeotropic distillation leaving as the residue a mixture of N-glycidylpiperazine oligomer and an inorganic chloride. The latter is formed during the neutralization of the chlorohydrin intermediate with base. When the base is, for example, potassium hydroxide, the inorganic chloride formed is potassium chloride. Polymerization of the above-described mixture affords particles of crosslinked, water-insoluble poly(N-glycidylpiperazine) with inorganic chloride randomly distributed therein. Washing of these poly(N-glycidylpiperazine) particles with water extracts the inorganic chloride therefrom leaving highly porous particles of crosslinked, water-insoluble poly(N-glycidylpiperazine). This procedure is equally applicable to N-glycidyl polyalkylpiperazines.

The base used for neutralization of the chlorohydrin intermediate is not critical and can be any alkali metal hydroxide or alkaline earth hydroxide.

As a variation, up to about 300 parts of other water-soluble filler can be physically blended into each 100 parts of N-glycidylpiperazine oligomer to enhance the porosity in the polymers prepared therefrom when extracted with water. These too are not critical and can be inorganic salts, such as, alkali metal or alkaline earth sulfites, sulfates, halides and the like or organic water-soluble materials, as for example, ethers such as polyethylene oxide, disaccharides such as sucrose, monosaccharides such as glucose or fructose, and the like.

The choice of azeotropic agents used in any of the facets of this invention is not critical. Exemplary agents include liquid aromatic hydrocarbons such as, benzene, toluene or xylene; liquid aliphatic hydrocarbons such as, hexanes, heptanes or octanes; and the like. While the amount of azeotropic agent is not critical, it is preferred to use a stoichiometric excess based on the amount of water present during polymerization.

The N-glycidylpiperazine oligomer can be unsubstituted or substituted on the piperazine ring moiety with up to 4 lower alkyl groups having 1 to about 8 carbon atoms.

Specific examples demonstrating the preparation of highly porous, crosslinked, water-insoluble poly(N-glycidylpiperazines) are given below.

EXAMPLE 12

Preparation of Porous Particulate Poly(N-glycidylpiperazine)

Fifteen grams of the beads of poly(N-glycidylpiperazine) prepared in Example 11 were placed in a 1-liter beaker equipped with a magnetic stirrer with 300 ml. of distilled water. The beads and water were agitated by the stirrer for 1 hour, and the water then decanted and tested for chloride anion by means of aqueous silver nitrate solution. A positive test was evinced by the formation of a white precipitate of silver chloride. The procedure was repeated six more times with the test showing less and less chloride until the 5th hour when no chloride was found in the wash water. Tests after the 6th and 7th hour confirmed this. The beads were then recovered on a Büchner funnel, and dried in vacuo. A yield of 7.9 g. of beads of poly(N-glycidylpiperazine) free of KCl was obtained.

When the adsorbtive capacity of these beads was measured using the technique described in Example 11, it was found that they adsorbed 18.3% of their weight of $SO_2$ as opposed to 6.9% for the beads not extracted with water.

EXAMPLE 13

Preparation of Porous Particulate Poly(N-glycidylpiperazine)

A 2-liter, 3-necked flask equipped with a paddle stirrer, condenser and Dean-Stark water trap was charged with a solution of 40 g. of N-glycidylpiperazine oligomer in 160 ml. of water, a solution of 30 g. of NaCl in 80 g. of water, 1000 ml. of toluene and 1.0 g. of Parlon S-125. The mixture was stirred at reflux for 4 hours during which time 234 ml. of water was removed. The flask was cooled, the contents filtered and dried at 60°C. in vacuo which produced 64.0 g. of fine beads of poly(N-glycidylpiperazine) which were insoluble in water.

Twenty-five grams of the beads thus prepared were extracted in a 1 liter beaker by stirring with 400 ml. portions of distilled water for 1 hour intervals. After five extractions the silver nitrate test for chloride was negative. The extracted beads were recovered by filtration on a Büchner funnel and dried in vacuo without heating.

The absorbtive capacity of these beads was measured using the technique described in Example 11. It was found that they adsorbed 35.4% of their own weight of $SO_2$. When the sample tube was put back into the adsorption line for 4 more hours, it was found that although 250 to 1400 ppm of $SO_2$ was present in the effluent, there was still appreciable SO$_2$ adsorption such that the tube had adsorbed 65% of its weight of SO$_2$.

EXAMPLE 14

Desorption of SO$_2$ from Porous Particulate Poly(N-glycidylpiperazine)

In order to demonstrate the regeneration of porous particulate poly(N-glycidylpiperazine) the beads collected in Example 13 containing 65% of their weight of adsorbed SO$_2$ were desorbed in the following manner. The standard gas mixture containing 3000 ppm of SO$_2$ was replaced with argon at a flow rate of 100 cc/min. The argon passed through the Teflon tube at an oven temperature of 95°C. The initial SO$_2$ content of the effluent gas was greater than 3000 ppm. After 6 hours the effluent gas contained 660 ppm of SO$_2$. The Teflon tube was removed from the test apparatus and weighed, showing that 71.5% of the adsorbed SO$_2$ had been desorbed. The tube was put back in the test apparatus and argon passed through again under the conditions described above. After an additional 4 hours the weighed tube indicated the amount of SO$_2$ desorbed was 88.5%.

Although the invention has been described in its preferred forms with a certain degree of particularity, it is understood that the present disclosure of the preferred forms has been made only by way of example and that numerous changes may be resorted to without departing from the spirit and scope of the invention.

What is claimed is:

1. Method for removing SO$_2$ from gas mixtures containing moisture which comprises contacting said gas mixtures with a crosslinked, water-insoluble polymer of N-glycidylpiperazine or N-glycidyl polyalkylpiperazines at a temperature of about −10° to about 110°C.

2. Method claimed in claim 1 wherein the polymer is a porous, particulate resin.

3. Method claimed in claim 1 wherein the polymer is deposited on a support.

4. Method claimed in claim 3 wherein the support is a cellulosic substance.

5. Method claimed in claim 3 wherein the support is a polyurethane.

6. Method claimed in claim 3 wherein the support is a mixture of poly(ethylene oxide) and wood flour.

7. Method claimed in claim 3 wherein the support is silica.

8. Method claimed in claim 3 wherein the support is glass fiber.

9. Method claimed in claim 1 wherein the temperature of the polymer is raised to about 60° to about 160°C. after adsorption of SO$_2$ whereby the adsorbed SO$_2$ is desorbed regenerating the polymer.

10. Method claimed in claim 1 wherein the polymer is treated with an inorganic base after adsorption of SO$_2$ whereby the adsorbed SO$_2$ is removed regenerating the polymer.

11. Method claimed in claim 1 wherein the gas mixture is ambient air containing about 0.01–0.2 ppm of SO$_2$.

* * * * *